United States Patent [19]

Gutman

[11] 4,317,346
[45] Mar. 2, 1982

[54] VEHICLE IGNITION-TRANSMISSION PROTECTION ENCLOSURE

[76] Inventor: Edward J. Gutman, 1498 Middleton Rd., Cleveland Heights, Ohio 44121

[21] Appl. No.: 102,021

[22] Filed: Dec. 10, 1979

[51] Int. Cl.³ .................... B60R 25/00; E05B 17/14; G05G 5/06
[52] U.S. Cl. ...................... 70/238; 70/203; 70/212; 70/424; 70/DIG. 58
[58] Field of Search .............. 70/238, 203, 424, 428, 70/426, 423, 237, 212, 200, 232, 211, 429, 430, DIG. 58

[56] References Cited

U.S. PATENT DOCUMENTS

| 97,713 | 12/1869 | Smith | 70/430 |
|---|---|---|---|
| 1,181,378 | 5/1916 | Eckart | 70/200 |
| 1,439,552 | 12/1922 | Johnson | 70/424 X |
| 1,453,004 | 4/1923 | Collion | 70/203 |
| 1,579,395 | 4/1926 | Rohm et al. | 70/199 |
| 1,850,602 | 3/1932 | Pineo | 70/212 X |
| 1,919,701 | 7/1933 | Morreale et al. | 70/232 |
| 2,463,195 | 3/1949 | Mungan | 70/416 |
| 2,749,235 | 6/1956 | Frost | 70/232 |
| 2,883,850 | 4/1959 | Falck | 70/DIG. 58 |
| 3,284,121 | 11/1966 | Lyon | 70/416 X |
| 3,635,057 | 1/1972 | Foote et al. | 70/424 |
| 3,703,092 | 11/1972 | Elliott | 70/252 X |
| 3,866,445 | 2/1975 | Erwin | 70/428 |

FOREIGN PATENT DOCUMENTS

| 1356917 | 2/1964 | France | 70/203 |
|---|---|---|---|
| 185181 | 9/1963 | Sweden | 70/202 |

Primary Examiner—Roy D. Frazier
Assistant Examiner—Carl F. Pietruszka
Attorney, Agent, or Firm—Oldham, Oldham, Hudak & Weber Co.

[57] ABSTRACT

A vehicle ignition-transmission protection enclosure is provided, whereby the ignition switch and transmission gear lever are protected from tampering and vandalism. The protection enclosure secures the transmission gear lever in combination with the ignition switch, such that movement of the former and access to the latter is prevented during installation. The protection enclosure includes an adjustable transmission lever yoke which surrounds a segment of the transmission gear lever shaft. That yoke may reside within a hinged, flanged, and contoured apparatus, comprising the remainder of the protection enclosure, that may be repeatedly and effortlessly installed and removed.

5 Claims, 5 Drawing Figures

VEHICLE IGNITION-TRANSMISSION PROTECTION ENCLOSURE

BACKGROUND OF THE INVENTION

This invention relates to a protection enclosure designed for vehicle ignition switches and vehicle transmission gear levers.

A vehicle having a steering column with an ignition switch and transmission gear lever thereon has remained susceptible to vandalism and tampering which results in the destruction of the vehicle or its theft from the owner. The ignition switch in most vehicles is located on the steering column, according to Governmental regulation and designer choice. The ignition switch typically has two flanges extending from the keyhole to permit manipulation by the driver of the vehicle. On many automobiles, the transmission gear lever is also located on the steering column, wherein a shifting of the lever relative to the access to the steering column alters the gear mechanism associated with the drive train of the vehicle.

Previously, attempts to secure and protect the ignition switch on the steering column have adopted various engineering designs. U.S. Pat. No. 3,635,057 discloses a padlock securement of the ignition switch. U.S. Pat. Nos. 3,665,738, 3,948,069, 4,008,589, 4,008,590, 4,062,193, 4,074,550, 4,098,102, 4,104,895, and 4,118,961 all disclose locking devices which utilize the circumference of the steering column to encompass the ignition switch. U.S. Pat. No. 3,866,445 discloses an ignition switch which mimics the shape of the ignition switch to effect its securement thereto.

These various locking devices have failed to achieve a protection enclosure designed not only for covering the ignition switch but preventing the manipulation of the transmission gear level. According to present designs and Government regulations, only certain positions in the ignition switch effect a release of pressure against the transmission gear lever so it may be manipulated. Access to the ignition switch and removal of the production device leaves the transmission gear lever completely unprotected. Therefore, a protection enclosure device is necessary to symbiotically prevent manipulation of the transmission gear lever and access to the ignition switch to protect the vehicle from tampering or vandalism resulting in theft.

SUMMARY OF THE INVENTION

Therefore, it is an object of the invention to provide a vehicle ignition-transmission protection enclosure, whereby the ignition switch on the steering column of the vehicle is enclosed and movement of the transmission gear lever on the steering column is restrained by the protection enclosure device.

It is an object of the invention to provide a protection enclosure device for a transmission gear lever, such that movement of the transmission gear lever is prevented by a yoke surrounding it but housed within the protection enclosure device.

Moreover, it is another object of the invention to provide a vehicle ignition-transmission protection enclosure device wherein the device is hinged to provide ease of installation and removal.

Yet another object of the invention is to provide a vehicle ignition-transmission protection enclosure device which encloses the ignition switch and protects against movement of the transmission gear selector lever without securement of the device about the circumference of the steering column.

These and other objects of the invention, which will become more apparent as the detailed description of the preferred embodiment proceeds, are achieved by a device for the interlocking securement protection of the ignition keylock and the transmission gear shift lever on vehicle steering columns, comprising: A pivotable enclosure mountable adjacent an axial segment of the steering column, said enclosure surrounding the ignition switch and a portion of the transmission gear lever, said enclosure including: (a) An adjustable transmission selector lever yoke having an upper curved portion and a lower curved portion, which provide with their contiguous relationship after assembly, a yoke having a brace tab adjacent to an aperture in which the transmission gear lever is secured; (b) An upper enclosure piece having a cover and a flange; and, (c) A lower enclosure piece having a and a flange, means to pivotally connect the upper and lower enclosure pieces whereby when pivoted together with the flanges adjacent each other a compartment is formed to engage around the yoke and cover the ignition switch compartment, and means to removably lock the flanges together.

DESCRIPTION OF THE DRAWINGS

For a basic understanding of the vehicle ignition-transmission protection enclosure device, reference is had to the following drawings, wherein.

DETAILED DESCRIPTION OF THE PREFERRED EMBODIMENTS

Figure 1:
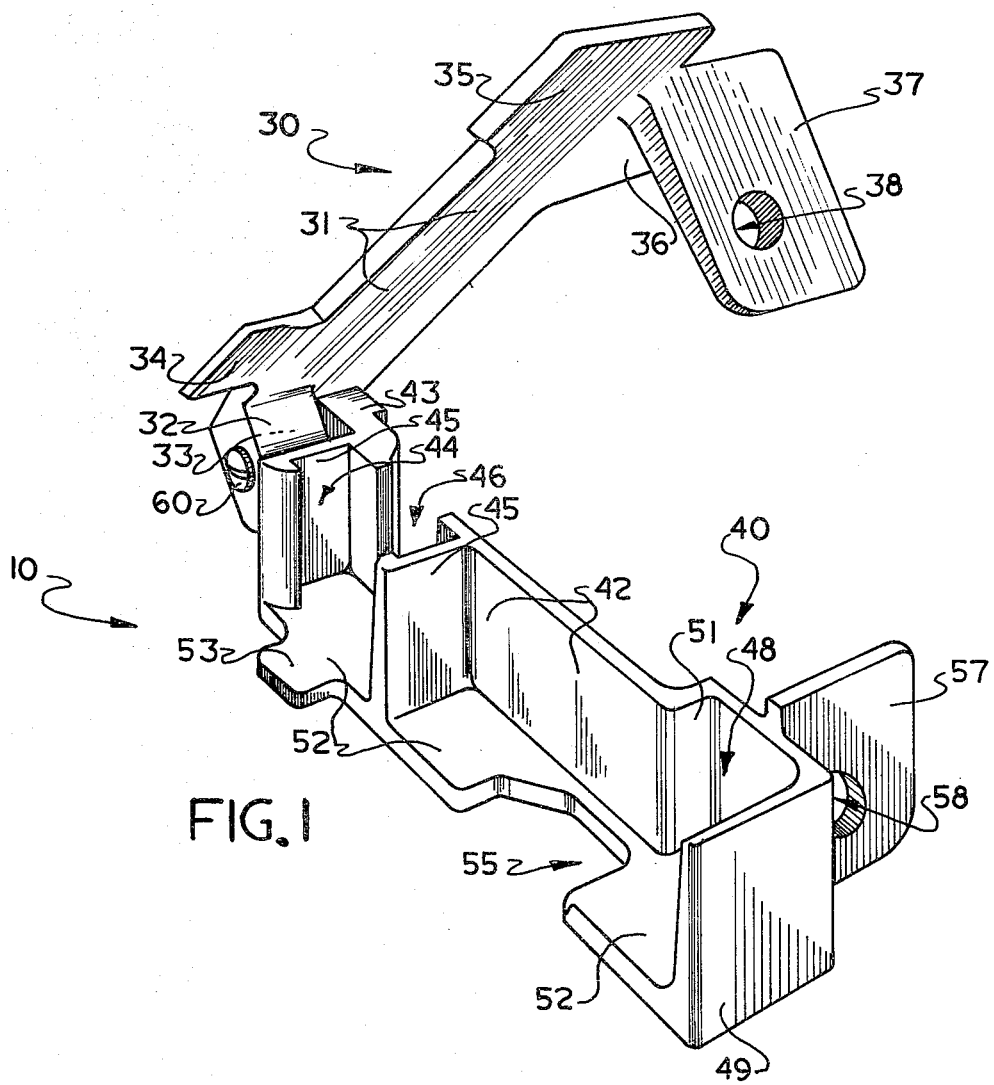
FIG. 1 is a perspective view of the upper hinged piece and the lower hinged piece pivotably mounted together.
Figure 2:
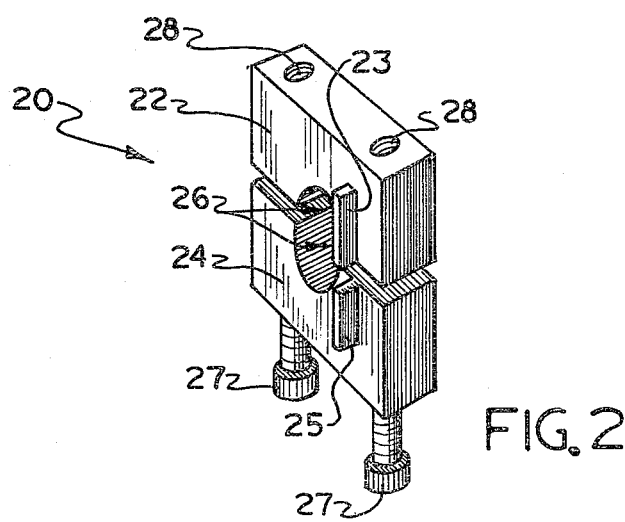
FIG. 2 is a perspective view of the adjustable transmission gear lever yoke.

For a complete understanding of the scope of the best mode of the invention, reference is had to FIG. 1. One part of the vehicle ignition-transmission protection enclosure device, generally referred to as 10, is comprised of an upper hinged piece and a lower hinged piece, generally referred to as 30 and 40, respectively. The upper hinged piece 30 is joined to the lower hinged piece 40 at the contact of pivot portion 32 with pivot portion 43. A fastener 60 passes through orifice 33 and into pivot portion 43 to provide the pivotable characteristic for device 10.

The upper hinged piece 30, as well as having pivot portion 32, is also composed of cover portion 31 and padlock protecting cover portion 36. Extending from cover portion 31 are an upper flange 34 associated to protect the transmission gear shift lever and flange 35 designed to protect the ignition keylock, flange 35. Flanges 34 and 35 are so spaced on cover portion 31, such that flanges 34 and 35 prevent access to the transmission gear shift lever and ignition keylock areas in lower hinged piece 40 and thereby against attack from above. The particular shape of flange 34 extends towards the root of the transmission gear shift lever with the steering column, in order that the root portion is protected. The design of flange 35 is shorter than that of flange 34 because a portion of the steering column protrudes to provide the well in which the ignition switch resides.

Extending from cover 31 opposite to flange 35 is a padlock flange 37. The flange 37 has an aperture 38 therethrough. The padlock flange 37 is strengthened by a web 36, integrally depending therefrom, and is positioned so aperture 38 aligns with aperture 58 on the lower hinged piece 40.

Lower hinged piece 40 is composed of a pair of longitudinally extending walls 42 and 52, and, pivot portions 43, and to provide the side and underneath enclosure portection for ignition keylock and transmission gear shift lever. Vertical wall 42 has a shift lever recess 43 therein between oppositely-notched transverse walls 45, which are joined thereto along with horizontal wall 52, the combination of the horizontal, the vertical, and the opposed notches in the two transverse walls forming compartment 44 for receiving the lever yoke. Compartment 44 is of sufficient size to accommodate adjustable transmission lever yoke 20 in order that yoke 20 be enclosed by the cover portion 31 to complete the securement of the transmission gear lever. The compartment walls 45 are notched to prevent movement of yoke 20 within transmission yoke compartment 44.

The vertical wall 42 is transversely stepped horizontally outward at 51 along with part of the horizontal wall 52 joined thereto, and both terminate at a transverse wall 49 joined thereto, and this enlarged enclosure end forms a compartment 48 designed to accommodate the protrusions on an ignition keylock which is mounted in a radial boss on the circumference of the steering column. It is within compartment 48 that, in combination with cover portion 31 and ignition keylock protection flange 35, that the ignition keylock is covered and protected from vandalism and tampering.

In order to provide for complete contact of the enclosure device 10 with the steering column, wall 52 has an ignition keylock recess 55 and a lower transmission flange 53. Ignition keylock recess 55 accommodates the lower finger flange of the ignition keylock, and lower transmission flange 53 accomplishes the same purposes as upper transmission gear lever protection flange 34 of upper hinged piece 30.

Extending outwardly from ignition keylock compartment 48 is lower padlock flange 57 having aperture 58. The position and arrangement of flange 57 is designed to align aperture 58 with aperture 38 of flange 37. When to pivot occurring at fastener 60 joins upper hinged piece 30 in contact with lower hinged piece 40, upper padlock flange 37 can close with lower padlock flange 57 permitting a conventional padlock shackle to pass through aligned apertures 38 and 58.

The transmission gear lever is secured within transmission yoke compartment 44 via adjustable transmission gear lever yoke 20. This yoke 20 is composed of upper member 22 and lower member 24 joined by two securement screws 27 within threaded orifices 28. The curved portions of the upper member 22 and the lower member 24 are semicylindrical in nature, which when placed in contact create aperture 26 through which the transmission gear lever may be secured. A tightening of securement screws 27 secures the yoke 20 about the gear lever. Yoke 20 further has an upper brace tab 23 on the upper curved portion 22 and a lower brace tab 25 on lower member 24. Tabs 23 and 25 prevent excess movement of yoke 20 within transmission yoke compartment 44.

Figure 3:
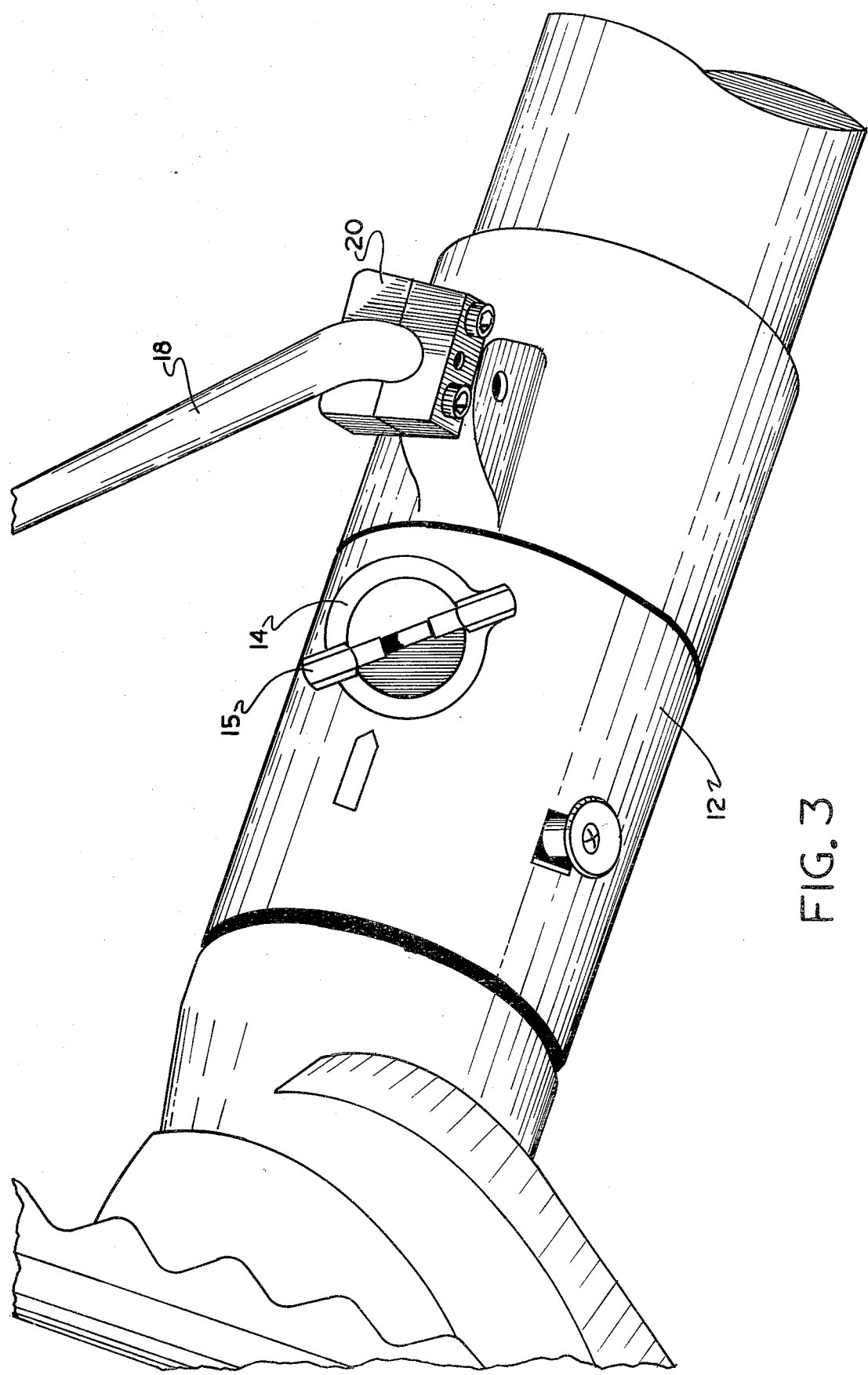
FIG. 3 is a depiction of the installation of adjustable transmission gear lever yoke about a segment of the transmission gear lever.
Figure 4:
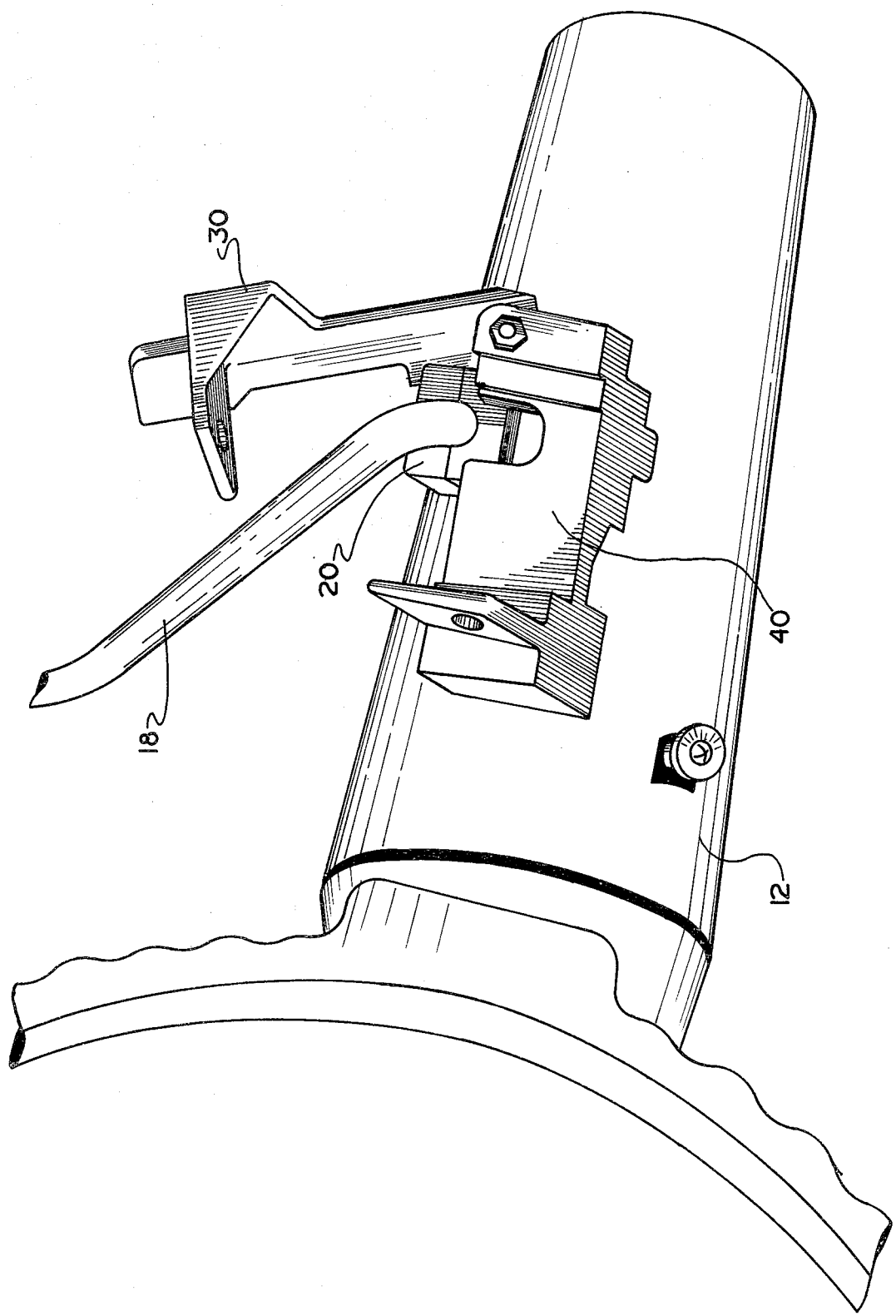
FIG. 4 is a depiction of the installation of the enclosure device about the ignition switch and transmission gear lever; and, FIG. 5 is a depiction of the completed installation of the enclosure device on the steering column.
Figure 5:
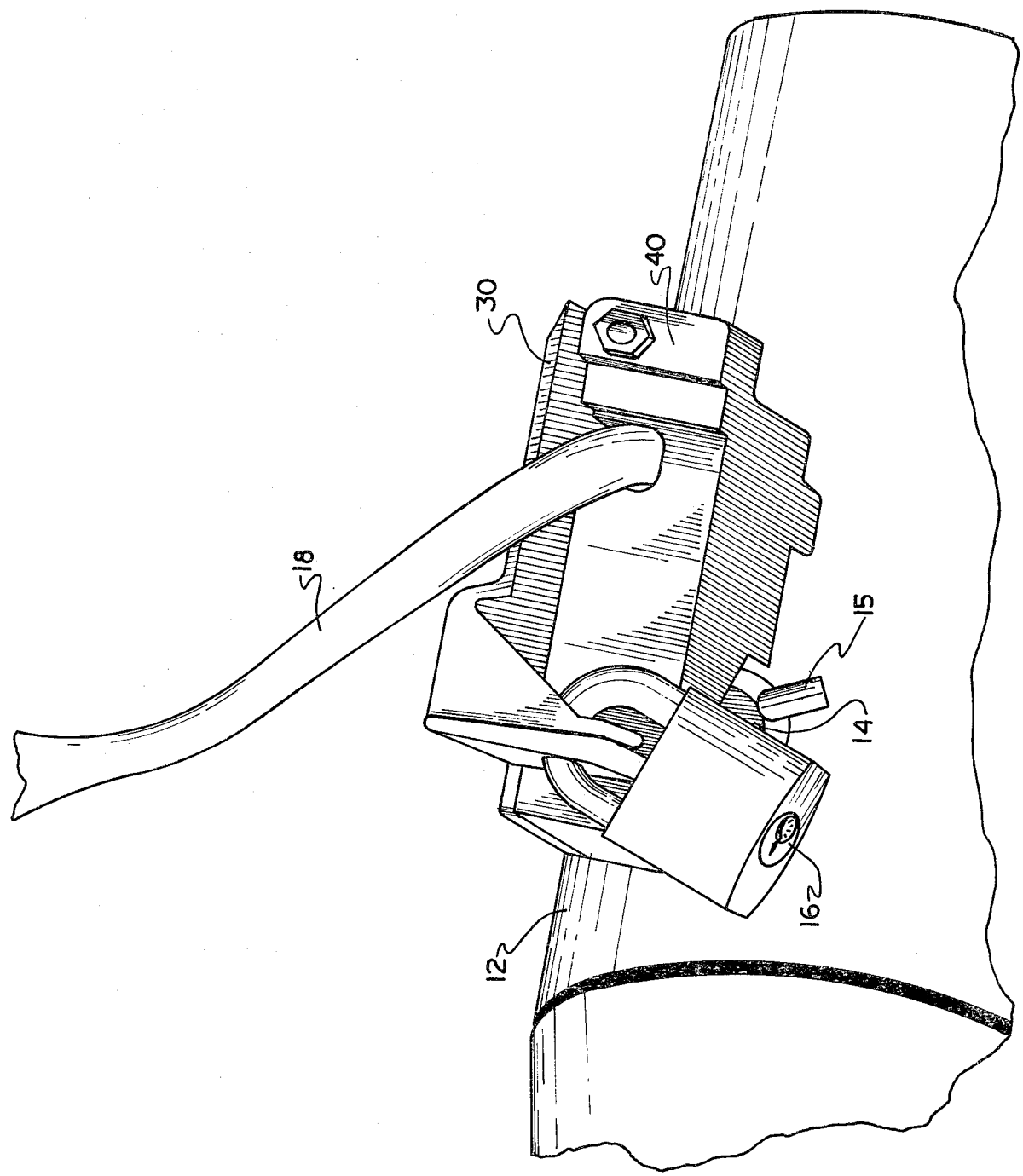

The assembly of vehicle ignition-transmission protection enclosure device 10 on steering column 12 may be understood by examining FIGS. 3, 4 and 5. In FIG. 3, the assembly of the adjustable transmission lever yoke 20 on transmission gear lever 18 is demonstrated. Upper member 22 and lower member 24 were initially separated by releasing securement screws 27 from threaded holes 28. Upper brace tab 23 and lower brace tab 25 are received in a loose-fitting relationship within the compartment 44 of device 10 to roughly position device 10, but clearly to restrict its movement relative to the shift lever 18. The shape of the outside of the yoke 20 is complementary to the walls 45 and with yoke 20 slid into place, it is prevented from relative rotative movement on the shift lever 18.

Referring now to FIG. 4, the placement of protection enclosure device 10 is seen. Upper hinged piece 30 has been pivoted relative to lower hinged piece 40 at their respective pivot portions 32 and 43, the same being rotatably maintained by fastener 60. With yoke 20 secured to transmission gear lever 18, that yoke 20 is placed within transmission yoke compartment 44. The extension of transmission gear lever 18 proceeds through transmission gear lever recess 46, and the yoke 20 is restrained in place by the two notched yoke compartment walls 45.

Alignment of the enclosure device 10 with respect to the ignition switch compartment 48 and the ignition switch 14 is then necessary. The tolerances of movement found between the transmission gear lever yoke 20 and its compartment 44 allow alignment of the ignition keylock 14 in its compartment 48. The ignition keylock 14 with its finger flanges 15, as seen in FIG. 3, is covered by the compartment 48, whereupon upper hinged piece 30 rotates at its pivot portion 32 to close with lower hinged piece 40, such that aperture 38 of flange 37 aligns with aperture 58 of flange 57.

As seen in FIG. 5, the communication of aperture 38 and aperture 58 permit the use of a padlock 16 which is conventional to those known skilled in the art. The enclosure of the ignition switch 14 and the immobilization of transmission gear lever 18 completely protects those two objects from tampering, abuse, and maneuvers resulting in theft of the vehicle.

The protection enclosure device 10 and the adjustable transmission gear lever yoke 20 may be made from sturdy materials known to those skilled in the art. While it is beneficial to have these sturdy materials made from a lightweight composition, it is not necessary to so provide. Typically, magnesium, aluminum, or a specialty steel may be employed to form device 10 and yoke 20, although a resinous material may also be utilized. Preferably, the enclosure device 10 may be made from a cast aluminum and yoke 20 may be formed from a specialty steel.

Frequency of use of the enclosure device 10 and yoke 20 requires an ease of assemblage and removal. The hinged nature of the device 10 facilitates rapid assemblage and swift removal from the yoke 20, and yoke compartment 44 is designed with tolerances that accommodate rapid assemblage, yet which maintain the protective enclosure of yoke 20 within the device 10. The device 10 may be stored in any convenient location within the vehicle while the vehicle is in operation. The yoke 20 however may be retained on the transmission gear lever 18, for its position on gear lever 18 does not effect lever 18 in its customary and normal operations.

While in accordance with the patent statutes, a best mode of the invention has been disclosed, the invention is not to be limited thereto or thereby. Consequently, for an understanding of the complete scope of the invention, reference is had to the following claims.

What is claimed is:

1. An enclosure device for the interlocking securement protection of the ignition keylock and the transmission gear shift lever on vehicle steering columns comprising:
   (a) an adjustable transmission gear shift lever yoke having an upper member and a lower member, both said portions removably connected to each other and tightened into non-sliding relation around the shift lever adjacent the steering column, and including at least one brace tab on the yoke,
   (b) an enclosure comprising:
      (i) an elongated upper enclosure member including a longitudinal cover wall and a first padlock flange; and
      (ii) an elongated lower enclosure member pivotally connected at one end to an end of the upper member having a pair of longitudinal intersecting walls designed to mate with the upper member cover wall to define a three wall enclosure when both members are pivoted together, and a second padlock flange arranged in parallel adjacent relation to the first padlock flange when the members are pivoted together, separate transverse walls within the intersecting longitudinal walls to define a transmission yoke compartment and an ignition keylock compartment whereby with the members together said adjustable yoke fits into the transmission yoke compartment securing the enclosure to the shift lever with the brace tab preventing movement of the enclosure members relative to the shift lever so the keylock compartment covers the ignition keylock, and
   (c) means to hold the padlock flanges together.

2. A device for the interlocking securement protection of the ignition keylock and the transmission gear shift lever on vehicle steering columns according to claim 1, wherein a fastener is further included to secure said upper pivot portion and said lower pivot portion in a pivotable relationship.

3. A device for the interlocking securement protection of the ignition keylock and the transmission gear shift lever on vehicle steering columns according to claim 1, wherein a fastener is further included to incrementally secure said upper member and said lower member of said adjustable transmission gear shift lever yoke.

4. A device as set forth in claim 1 wherein the yoke has at least two external sides, and the transmission yoke compartment has complementary recesses into which the yoke sides slide, whereby with the enclosure members pivoted together, the yoke is fully enclosed.

5. A device according to claim 1 wherein the two yoke sides are straight and substantially parallel.

* * * * *